United States Patent

Mutschler et al.

[11] 4,174,764
[45] Nov. 20, 1979

[54] STEERING COLUMN SWITCH MOUNTING

[75] Inventors: Erich Mutschler; Adam Weber, both of Bietigheim-Bissingen, Fed. Rep. of Germany

[73] Assignee: SWF-Spezialfabrik fur Autozubehor Gustav Rau GmbH, Fed. Rep. of Germany

[21] Appl. No.: 603,381

[22] Filed: Aug. 11, 1975

[30] Foreign Application Priority Data

Aug. 12, 1974 [DE] Fed. Rep. of Germany ....... 2438653

[51] Int. Cl.² .................. B60K 26/00; H01H 3/16
[52] U.S. Cl. .................................... 180/78; 200/61.54
[58] Field of Search ............... 180/78; 280/775, 777, 280/779; 200/61.27, 61.35, 61.54, 61.57; 74/492, 496

[56] References Cited

U.S. PATENT DOCUMENTS 3,892,932   7/1975   Erdelitsch et al. ............... 200/61.54

FOREIGN PATENT DOCUMENTS 2453571   5/1976   Fed. Rep. of Germany ........ 200/61.54
2460068   6/1976   Fed. Rep. of Germany ........ 200/61.54

Primary Examiner—Joseph F. Peters, Jr.
Assistant Examiner—Donn M. McGiehan
Attorney, Agent, or Firm—McGlew and Tuttle

[57] ABSTRACT

A steering column switch mounting includes a sleeve which is insertable into the steering tube between the tube and the steering column which includes a portion which extends exteriorly of the tube forming a switch base plate and contact carrier. The interior sleeve portion includes a resilient strip which includes a locking stud which is biased against the steering tube and falls into a locking recess of the tube to hold the switch mounting in place.

10 Claims, 2 Drawing Figures

STEERING COLUMN SWITCH MOUNTING

BACKGROUND OF THE INVENTION

1. Field of the Invention

This invention relates in general to the construction of steering column switches and in particular to a new and useful steering column switch mounting which includes a sleeve member which is insertable into the top of a steering tube and which has a resilient strip portion with a locking stud which engages with the column and which carries an exterior base plate portion forming a contact carrier of the switch.

2. Description of the Prior Art

The present invention is particularly concerned with a steering column switch construction for an automobile of a type which includes a contact carrier member which is movable by a switch lever and which is mounted in a switch housing which is secured to the upper end of the steering tube which receives the steering column. The known steering column switches are usually secured to the steering tube by screw connections. In some instances clamps are also employed for joining the steering column switch to the steering tube. Such constructions have the disadvantage that they require a lot of mounting devices and arrangements for maintaining them in the operative orientation. The result is that they are very difficult to produce and to maintain and thus they are very costly.

SUMMARY OF THE INVENTION

In accordance with the present invention there is provided a steering column mounting which includes a carrier base plate which is formed as an outer extension of a sleeve member which is insertable in the steering tube between the tube and the steering column and which may be positioned in an exact location for operation by engagement of a resiliently biased elastic strip member which carries a locking stud which engages into an opening which is defined at a predetermined location on the steering tube in accordance with the switch requirements. The sleeve is insertable into the top of the steering tube and includes an interior inner collar which has a bearing engagement with a bearing projection formed on the steering column. The interior portion of the sleeve is formed with a lower skirt having one or more resilient or elastic strip portions terminating at their lower ends in outwardly extending locking studs which are of greater diameter than the interior of the steering tube and which spring out into openings located on the tubes at a predetermined location from the top thereof thereby fixing the bearing sleeve mounting and the base plate of the switch housing which is carried thereby. The construction of the switch housing base plate has a bearing sleeve which is insertable into the steering tube considerably simplifies the mounting of the switch and the associated elements and the exact positioning thereof in relation to the steering tube. The sizing of the elastic strip elements and the location of the opening in the steering column precisely positions the bearing sleeve with the integrally formed contact carrier base plate which is located so as to extend over the top of the tube on the exterior thereof. The combined bearing sleeve and switch base plate may be easily released from the steering column by pressing the studs of the elastic strip portion inwardly to effect release. The base plate portion of the bearing sleeve which extends on the exterior of the steering column extends downwardly along the outside thereof but is spaced sufficiently from the opening thereof to permit its free access.

In another embodiment of the invention the bearing sleeve is provided with addditional locking connections which are formed by insert members which are engageable into recesses formed in the tops of the bearing sleeve at a spaced location upwardly from the studs formed on the elastic strip members. The inserts may be inserted into the recesses of the bearing sleeve under resilient pressure and an outwardly extending projection or formation on the inserts engages into a receiving recess defined on the interior of the steering tube. The projection forms an upper lock which acts in conjunction with the stud formed at the lower end of the elastic strip portions to firmly hold the bearing sleeve with the switch base plate portions in position. In this latter embodiment the inserts must be removed in order to release the bearing sleeve.

In the preferred form of the invention the bearing sleeve includes an outer portion which overlaps a part of the steering tube and which is formed as a base plate and contact carrier. By such a construction the base plate provides both a part of the switch housing and also a carrier for one or more of the contacts for the switch.

Accordingly it is an object of the invention to provide a steering column switch mounting which includes a bearing sleeve which is insertable into the space between the steering tube and the steering column and which carries a base plate thereon for the switch housing which extends exteriorly of the steering tube and which has means associated therewith for releasably locking the bearing sleeve in the column at a selected location thereon.

A further object of the invention is to provide a steering column switch mounting which is simple in design, rugged in construction and economical to manufacture.

The various features of novelty which characterize the invention are pointed out with particularity in the claims annexed to this disclosure. For a better understanding of the invention, reference should be had to the accompanying drawings and descriptive matter in which are are illustrated preferred embodiments of the invention.

GENERAL DESCRIPTION OF THE PREFERRED EMBODIMENTS

Figure 1:
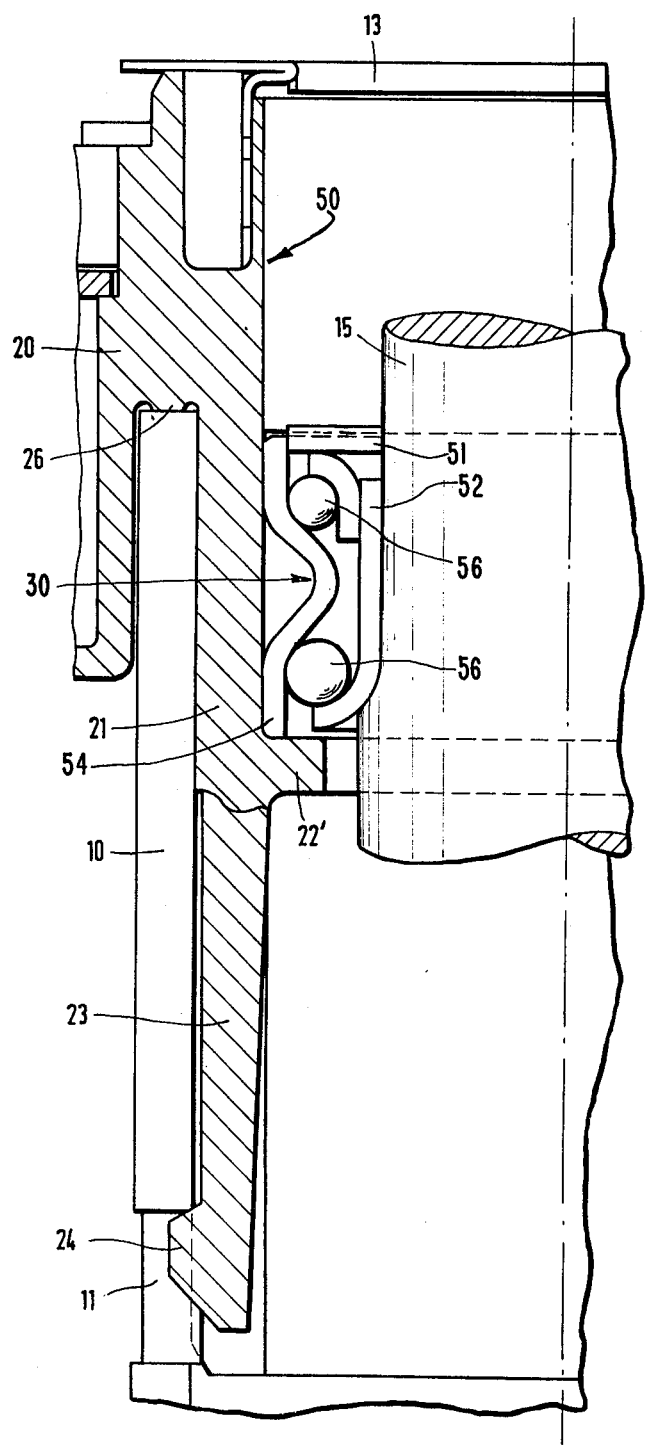
FIG. 1 is a partial sectional view of a steering column having a switch mounting constructed in accordance with the invention.

Referring to the drawings in particular the invention embodied therein in FIG. 1 comprises a switch mounting or mounting a switch such as a signal switch in association with a steering column 15 which is surrounded by a steering tube 10 which is spaced radially outwardly from the steering column.

In accordance with the invention the switch mounting includes a combined bearing sleeve and switch base plate or a contact carrier plate generally designated 50 which may be accurately positioned in respect to the steering tube 10. Combined bearing sleeve and base plate 50 includes a bearing sleeve portion 21 which is insertable into the top of the steering tube 10 between the interior of the steering tube and the steering column 15. The sleeve 21 includes an inner collar 22 forming a shoulder supporting resilient bearing means generally designated 30. Bearing means 30 advantageously includes a top plate portion 51, a resilient spring portion or two-part inner race portion 52, an outer portion 54 and ball bearings 56 between the inner race portion 52 and the outer portion 54. The entire resilient bearing means 30 is supported on an inner collar 22 and rotatably support the steering column 15 relative to the steering tube and also relative to the bearing sleeve portion 21.

In accordance with a further feature of the invention combined bearing sleeve and base plate 50 includes a base plate portion 20 which extends over the top of the steering column 10 and includes a portion which extends downwardly along the outer side of the steering tube 10. The intermediate portion of the base plate 20 includes a stop formation 26 which engages against the flat top surface of the steering tube 10.

The bearing sleeve portion 21 is also provided with integral elastic strips 23 which carry locking studs or projections 24 at their lower ends. The locking studs are shaped so as to permit inward deflection and resilient biasing of the strips 23 during insertion and insertion may proceed until the studs 24 engage outwardly into openings 11 formed on the steering tube at a predetermined location in accordance with the requirements for the mounting of the switch. In this simple manner the whole switch mounting is located precisely in respect to the steering tube 10.

In the embodiment shown in FIG. 1 a cover sheet 13 is provided at the upper end of the combined bearing sleeve and base plate 50. The steering column 15 extends through an opening in the cover sheet 13.

Figure 2:
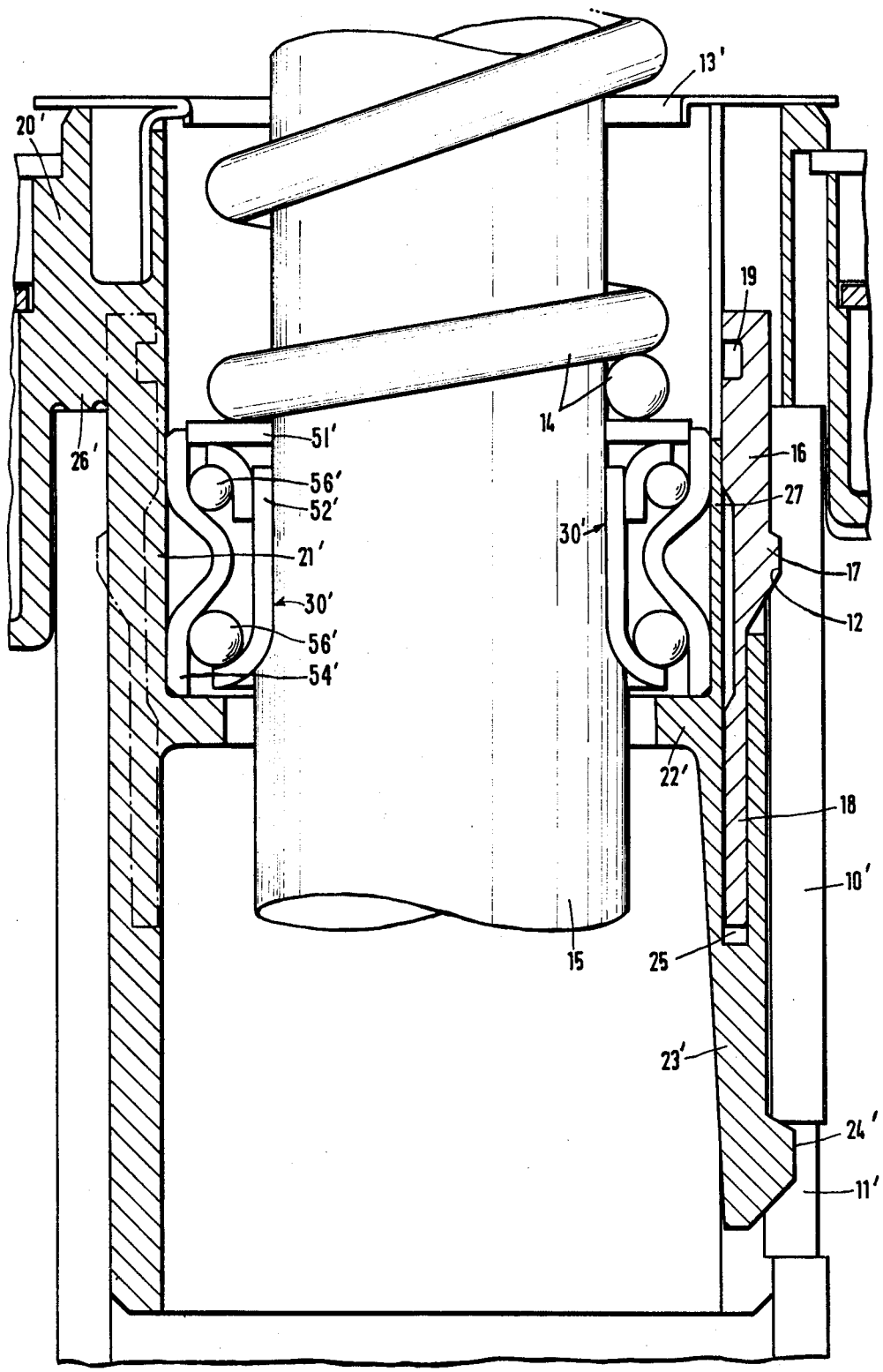
FIG. 2 is a partial axial sectional view of another embodiment of the invention.

In the embodiment of FIG. 2 similar parts are similarly designated but with primes. In this embodiment a compression spring 14 acts against the bearing means 30' through a bearing plate portion 51' through the top surface of the inner collar 22'. In the embodiment of FIG. 2 the bearing sleeve portion 21' is provided with a recess 25 opening upwardly for receiving relatively rigid insert 16 which can be fitted into the recesses after engagement of the studs 24' in the openings 11'. The insert 16 includes a locking stud or projection 17 which engages outwardly into a recess 12 defined in the interior of the steering tube 10'. The inserts 16 are advantageously made rigid so that a lower portion 18 thereof forms a stiffening of the resilient strips 23 so as to hold these strips against unlocking and release. The upper portion of the insert 16 is provided with a recess 19 facing toward the steering column 15 which is exposed in a recess of the steering tube for free engagement. The recess 19 forms a means for engagement of the inserts for easy removal by pulling out. For this purpose the compression spring 14 and the bearing means 52' has to be removed in advance. Thereafter a thin walled portion 27 of the bearing sleeve 21' can be bent to facilitate the pulling out of the insert 16. The insert 16 provides a means for the double securement of the combined bearing sleeve and base plate 50' in view of the fact that the insert 16 locked the elastic strip portion 23' and the inserts 16 themselves are locked by the inserted bearing means 52.

While specific embodiments of the invention have been shown and described in detail to illustrate the application of the principles of the invention, it will be understood that the invention may be embodied otherwise without departing from such principles.

What is claimed is:

1. A steering column switch mounting comprising a steering tube having an interior lock recess, a steering column arranged within and spaced inwardly of said steering tube, and a combined bearing sleeve and switch base plate member including an inner cylindrical sleeve portion disposed between said steering column and said steering tube and having an elastic strip portion adjacent its lower end with a locking stud lockably engageable in the lock recess of said steering tube, bearing means defined between said steering column and said bearing sleeve portion for holding said steering column and said bearing sleeve portion in relative position when said strip portion locking stud is engaged with said lock recess, said combined bearing sleeve and base plate including a base plate portion extending outwardly of said bearing sleeve portion and overlying the exterior of said steering tube.

2. A steering column switch mounting according to claim 1, wherein said bearing sleeve portion includes an inwardly extending collar forming a bearing receiving surface, said bearing means being applied against said bearing receiving surface.

3. A steering column switch mounting according to claim 1, wherein said bearing sleeve and said base plate portions are interconnected adjacent the top of said steering tube and form a stop surface therebetween bearing against the top of said steering tube.

4. A steering column switch mounting according to claim 1, wherein the lock recess in said steering tube comprises a complete opening through said tube accessible from the exterior, said base plate portion extending over a portion of the exterior of said steering tube without covering the lock recess opening whereby the opening is available for the inward deflection of the elastic strip portion of said bearing sleeve.

5. A steering column switch mounting according to claim 1, including a recess defined in the top of said bearing sleeve portions and a rigid insert engageable in the recess and reinforcing said elastic strip portions and providing an additional lock for said combined bearing sleeve and base plate.

6. A steering column switch mounting according to claim 5, including a stud lock carried by said insert engageable with said steering tube.

7. The steering column switch according to claim 1, wherein said base plate portion is a contact carrier plate.

8. A steering column according to claim 5, wherein said inner cylindrical sleeve portion includes a thin walled upper part which may be deflected inwardly to permit removal of said cone inserts.

9. A steering column switch mounting for use in association with a steering column having a steering tube arranged around the exterior thereof in spaced relation thereto, comprising a switch base plate member having an inner cylindrical sleeve portion engageable between the steering tube and the steering column and a portion extending outwardly from the top of said cylindrical sleeve portion over the top of the steering tube and a portion extending exteriorly of the steering tube forming a switch base plate, said cylindrical sleeve portion having at least one elastic strip with a locking stud formation which is biased into locking engagement with the steering tube at a predetermined location from the top of the steering tube.

10. A steering column switch mounting according to claim 9, including bearing means insertable between the steering column and said cylindrical sleeve portion for orienting said sleeve portion relatively to said steering column.

* * * * *